United States Patent
Lewis

(10) Patent No.: US 8,171,257 B2
(45) Date of Patent: May 1, 2012

(54) DETERMINING AN END OF VALID LOG IN A LOG OF WRITE RECORDS USING A NEXT POINTER AND A FAR AHEAD POINTER

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/567,710

(22) Filed: Sep. 25, 2009

(65) Prior Publication Data

US 2011/0078407 A1    Mar. 31, 2011

(51) Int. Cl.
*G06F 13/00* (2006.01)
(52) U.S. Cl. .................... 711/213; 711/E12.053
(58) Field of Classification Search .......... None
See application file for complete search history.

(56) References Cited

U.S. PATENT DOCUMENTS

| | | | |
|---|---|---|---|
| 5,287,363 A | 2/1994 | Wolf et al. | |
| 6,304,983 B1 | 10/2001 | Lee et al. | |
| 6,535,949 B1 | 3/2003 | Parker | |
| 7,343,521 B2 | 3/2008 | Kitamorn et al. | |
| 7,356,657 B2 | 4/2008 | Mikami | |
| 7,631,009 B1 * | 12/2009 | Patel et al. | 1/1 |
| 7,813,816 B2 * | 10/2010 | Fulton et al. | 700/11 |
| 2004/0078666 A1 | 4/2004 | Aasheim et al. | |
| 2004/0103123 A1 * | 5/2004 | Bradshaw | 707/202 |

OTHER PUBLICATIONS

Rosenblum et al., "The Design and Implementation of a Log-Structured File System", Proceedings of the 13th ACM Symposium on Operating Systems Principles, Feb. 1992, ACM Transactions on Computer Systems.

* cited by examiner

*Primary Examiner* — Hetul Patel
(74) *Attorney, Agent, or Firm* — David W. Victor; Konrad Raynes & Victor LLP

(57) ABSTRACT

Provided are a method, computer program product and system for determining an end of valid log in a log of write records. Records are written to a log in a storage device in a sequential order, wherein the records include a next pointer addressing a next record in a write order and a far ahead pointer addressing a far ahead record in the write order following the record. The far ahead pointer and the next pointer in a plurality of records are used to determine an end of valid log from which to start writing further records.

22 Claims, 4 Drawing Sheets

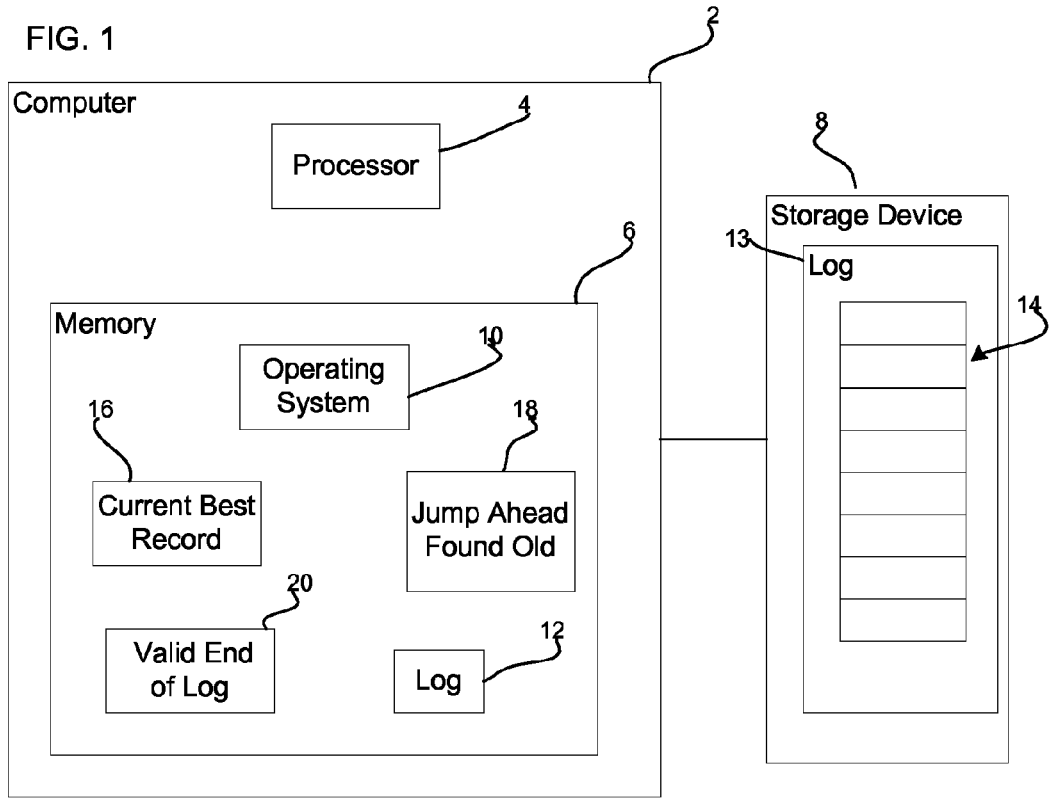
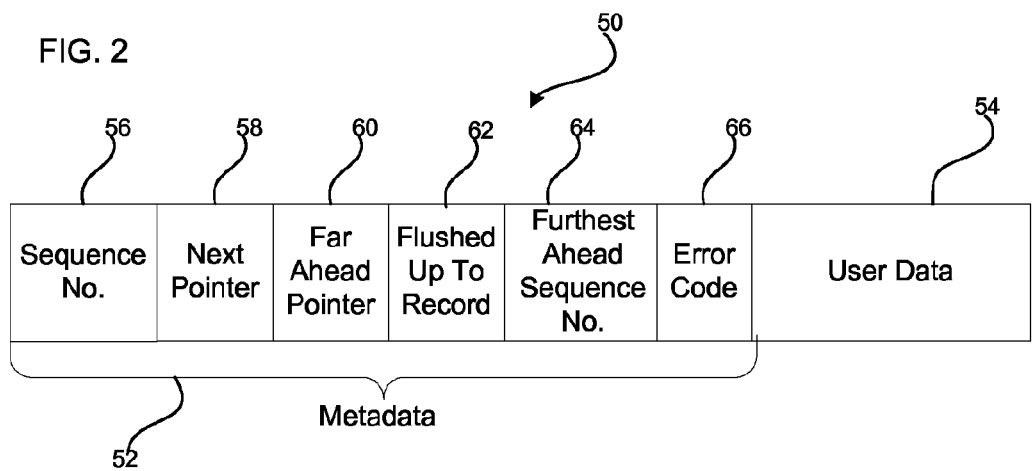

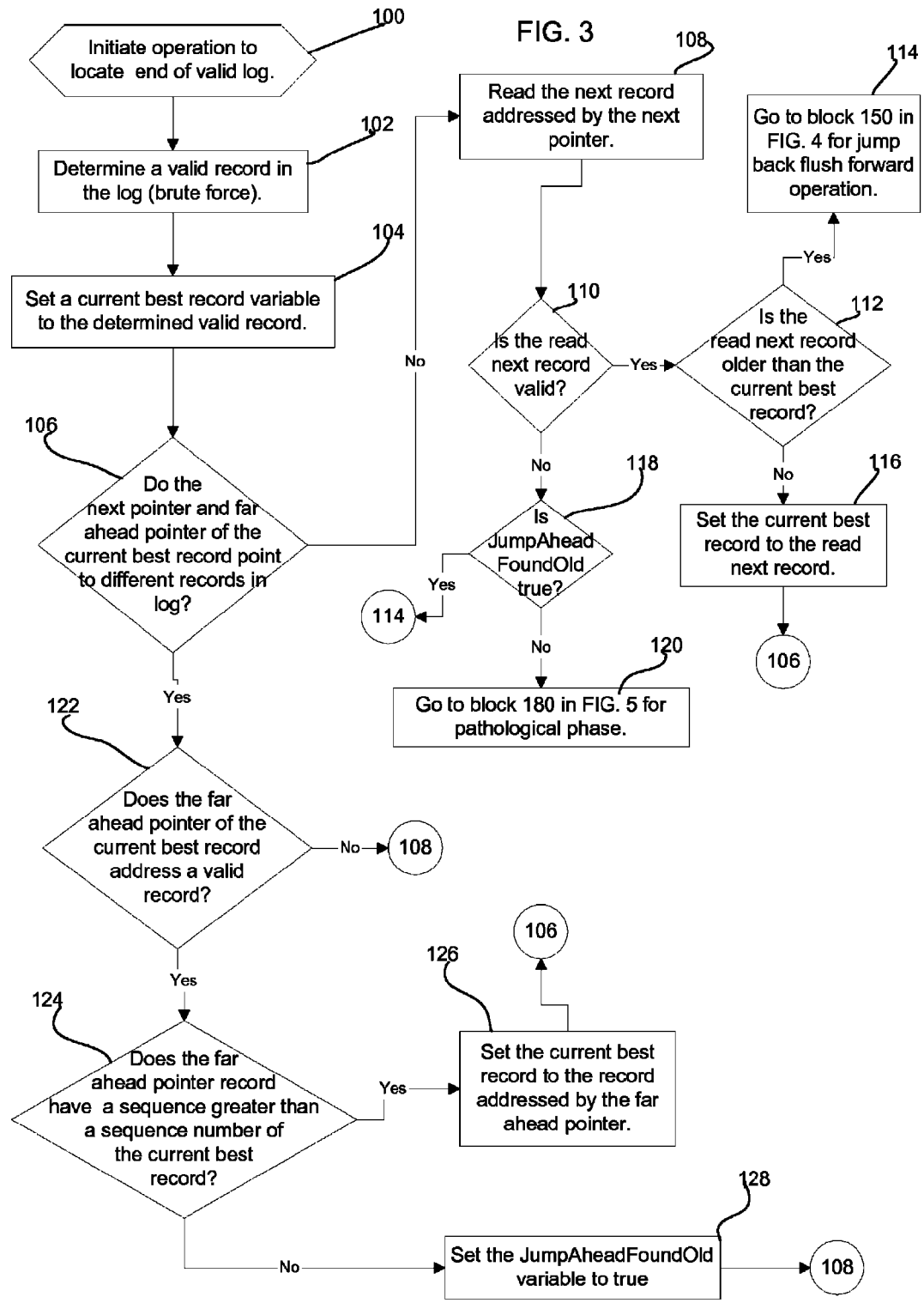

DETERMINING AN END OF VALID LOG IN A LOG OF WRITE RECORDS USING A NEXT POINTER AND A FAR AHEAD POINTER

BACKGROUND OF THE INVENTION

1. Field of the Invention

The present invention relates to a method, system, and computer program product for determining an end of valid log in a log of write records.

2. Description of the Related Art

In a log structured file system, a record is created when a write operation is performed with respect to a file, where the record includes metadata for the record, such as a sequence number and error correction code, and user data. The records are then written sequentially to a log in a storage device. In a log structured file system, all modifications are written to disk sequentially in a log-like structure to speed-up both file writing and crash recovery. Records written sequentially to the log may not be in contiguous physical spaces on the disk. The log may be the only structure on disk. The log may contain indexing information so that files can be read back from the log efficiently. Further, a plurality of writes can be sent to the disk at the same time and such writes may complete in an order different from the order in which they were sent. The last write started might be the first to finish.

During write operations, the log structured file system may periodically save a checkpoint to the disk indicating the valid end of log, or most recently written complete record, such that all previous records in the log to the valid end of log have also been successfully written to disk. After a restart operation, the operating system reads the checkpoint saved to disk to determine the state of the disk as of the last completed write and where to start writing log records. In certain systems, a portion of the disk may be allocated to store the checkpoint and updated during log operations to indicate the current end of the log.

There is a need in the art for improved techniques for determining the end of the log.

SUMMARY

Provided are a method, computer program product and system for determining an end of valid log in a log of write records. Records are written to a log in a storage device in a sequential order, wherein the records include a next pointer addressing a next record in a write order and a far ahead pointer addressing a far ahead record in the write order following the record. The far ahead pointer and the next pointer in a plurality of records are used to determine an end of valid log from which to start writing further records.

BRIEF DESCRIPTION OF THE DRAWINGS

FIG. 1 illustrates an embodiment of a computing environment.

FIG. 2 illustrates an embodiment of a log record.

FIGS. 3, 4, and 5 illustrate an embodiment of operations performed to locate and end of the log.

DETAILED DESCRIPTION

Figure 4:
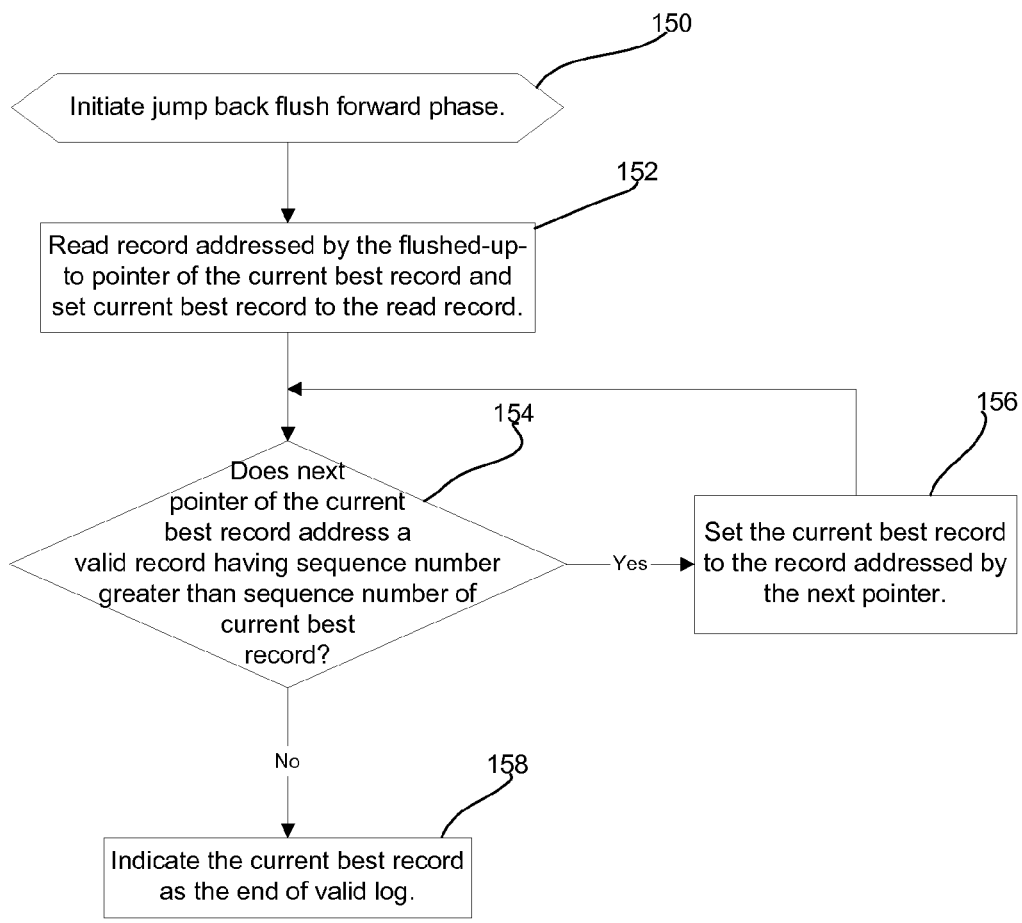

FIG. 1 illustrates an embodiment of a computer 2 having a processor 4, a memory 6, and an attached storage device 8. The memory 6 includes an operating system 10. The operating system 10 implements a log structured file system such that any write operations, including new files, modifications to an existing file, and deletion of all or part of a file, are written to records that are sequentially added to a log 12. The records in the log 12 are periodically flushed to a log 13, having the records 14 sequentially written, in an attached storage device 8. Thus, the log 12 comprises those records being created by the operating system 10 in memory 6 for eventual writing sequentially to the log 13 in the storage device 8. Although records are sequentially written to the log 13, such records may not be stored in contiguous physical locations in the storage device 8. In certain embodiments, the storage device 8 may comprise a solid state device comprised of solid state electronics, such as an EEPROM (Electrically Erasable Programmable Read-Only Memory), flash memory, flash disk, etc.

FIG. 2 illustrates an embodiment of a record 50, which is an instance of one of the records 14, added to the log 13 for a write operation, which may comprise adding a new file, deleting a file, or updating a file. As discussed, the operating system 10 adds records to the log 12 sequentially according to the write order during normal system operations. A record 50 includes metadata 52 and user data 54, which the operating system 10 writes during normal write operations. The metadata 52 includes a sequence number 56 comprising a sequential number of the record incremented from the last used sequence number, a next pointer 58 addressing a next sequential record in the log 13 according to a write order, and a far ahead pointer 60 addressing a record following the record in the write order, which may be the next record or any record following the next pointer 58 record in the write order.

In described embodiments, records are written according to a write order comprising a plan of the physical records to write in the order they are intended to be written. The write order is a plan of which physical locations will be used to store forthcoming records. In certain embodiments, new entries may only be appended to the log 12, 13 in the write order and records may not be deleted, moved, reordered, or inserted in the write order once it has been established. The write order may persist across reboots/crashes of the writer to the log 13. In certain embodiments, the state of the write order may be stored in the log 13, with updates to the write order being reflected in new records written to the log. The write order may not indicate records that have already been written.

The operating system 10 uses the metadata 52 as part of a bootstrap operation performed during system initialization to find the last valid record written to the log 13. To find the end of the log 13, the operating system 10 uses the far-ahead pointer 60 to jump ahead in the log 13 multiple records 14 to avoid sequentially scanning contiguous records 14. During system runtime operations when the operating system 10 is writing records 50 to the log 13, the far ahead pointer 60 may be set to point to the end of the write order (as of the moment when the record was composed). Alternatively, the far ahead pointer 60 may be set to point to a record preceding the last record in the write order. This distribution of far ahead pointers (mixing long forward jumps with relatively short forward jumps) ensures that, during bootstrap, the operating system 10 will use far ahead pointers that approach the end of the log 13 without overshooting the valid end of the log 13. If the far ahead pointer 60 overshot the end of the log 13, then the bootstrap process to find the valid end of log 13 may have to follow next pointers linearly through the log 13 when approaching the end of the valid log 13.

With respect to FIG. 2, a "flushed-up-to" pointer 62 addresses a record written earlier to the log 13 than the record 50, such that at the time that the record 50 was composed, the record addressed by the "flushed-up-to" pointer 60 and all records preceding the "flushed-up-to" record have been flushed (i.e., successfully written to the storage device 8). A furthest ahead sequence number 64 comprises a sequence number of the last record in the write order, as of the time when the record 50 was composed. The far ahead pointer 60 may point to a record in the write order including or preceding the furthest ahead sequence number 62 in the write order. An error code 66 provides an error correction code that the operating system 10 uses to determine whether a record 50 and its metadata 52 are valid. Thus, the metadata items 56 and 64 comprise sequence numbers and the items 58, 60, and 62 comprise pointers to physical records in the log 13.

In certain embodiments, records 14 may be reused over time but not modified in place. Instead, records (once written) will remain unmodified for their entire lifetime. A garbage collection mechanism may determine when records are available to be rewritten. The metadata may remain intact until the record is completely re-used. As a consequence, in certain embodiments, all records are readable unless the operating system 10 has recently attempted to rewrite them. In described embodiments, there is the possibility that records in the log 13 are unreadable if the computer 2 crashed while writing to them, i.e., writes are not atomic.

Records 14 may experience a life cycle of WRITING->VALID->CLEAN->SCHEDULED->WRITING states. The WRITING state occurs when the record 50 is being modified; VALID means that the record is completely written and in use; CLEAN means that the record no longer is in use (but has not changed); and SCHEDULED means that it has been put on the write order for future reuse. A record may be invalid during the WRITING phase. In all other phases, the record cannot be altered and would have the same contents as the most recent write. Thus, at any given time, the vast majority of the records in the system will likely have valid contents (that is, they are in the VALID, CLEAN, or SCHEDULED states).

The furthest ahead sequence number 64 provides, at the time when a record 50 is created, the sequence number of the very last record in the write order. The sequence number 64 may comprise the "far ahead pointer" 60 and other times may not. The operating system 10 may place "short jumps" in the far ahead pointers 60, whereas the furthest ahead sequence number 64 always provides the very last record in the (current) write order.

The furthest ahead sequence number 64 is used during runtime or normal system operations. If during runtime operations, the operating system 10 wants to overwrite a physical record, the furthest ahead sequence number 64 is used, which is stored in the current version of that record 50 on disk. If the operating system 10 has not already flushed the log 12 (i.e., destaged writes in the log 12 to the storage 8) up through that sequence number 64, then the write (and all future writes) is delayed until the already-started writes flush up (i.e., are destaged) through the furthest ahead sequence number 64. If the write order is very short or writes are occurring very quickly, then using the furthest ahead sequence number 64 ensures that data is flushed before being overwritten, which helps avoid disk corruption and prevents the bootstrap algorithm, used to determine the valid end of log 13 during system initialization, from failing.

Figure 5:
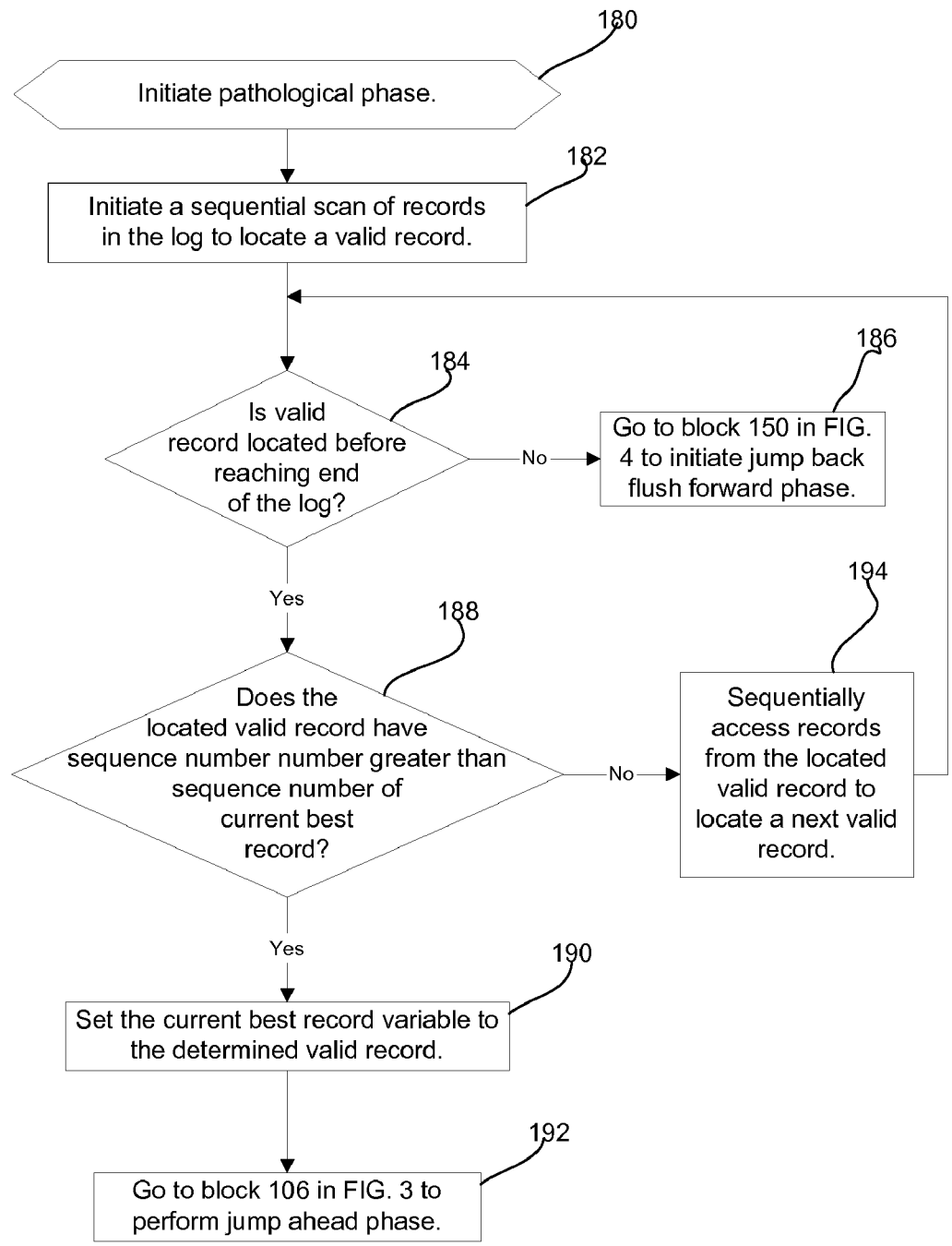

FIGS. 3, 4, and 5 illustrate operations performed by the operating system 10 to determine a valid end of the log 13, which comprises the last valid complete record written to the log 13, such that all preceding records in the log are also valid and complete. In alternative embodiments, the operations of FIGS. 3, 4, and 5 may be performed by an application program or device driver for the storage device 8. The operations may be initiated by the operating system 10 during system initialization, such as after a cold or warm restart (or other type of restart or initialization) where the operating system 10 needs to determine the valid end of the log 13 to which writes may be applied. In the described embodiments, the operating system 10 does not maintain checkpoint information of the last written record to the log 13 in the storage device 8. Instead, the valid end of the log is determined by processing the information in the metadata 52 for the records.

With the operations of FIGS. 3, 4, and 5, the operating system 10 determines a "tail" of the record. A tail is a record which was successfully written to the log 13 (at least, was written sufficiently that its metadata can be recovered) but where the next record in the log 13 was not successfully written to the log. A record 14 may be invalid if the record 14 was partially written to the log 13, but the operating system 10 is unable to read the metadata 52, which may occur if the record 14 was never successfully flushed to the storage device 8. Moreover, there may be multiple tails in the log 13 if there was a crash of the computer 2 while multiple records 52 were in flight to the log 13. If there are multiple tails, then the earliest of the tails may be regarded as the "end of valid log", which is the location at which the operating system 10 will start writing new records. The end of valid log may be saved in the end of valid log variable 20 in the memory 6. If a log contains more than one tail, then the other tails are records which made it to disk but which cannot be regarded as "valid" because previously written records may be missing or invalid.

With respect to FIG. 3, the operating system 10 initiates (at block 100) an operation to find a valid end of the log 13. This operation may be performed during system initialization or startup, which may occur after a crash resulting in partial records being written to the log 13 or some records in flight being lost altogether. The operating system 10 determines (at block 102) a valid record 14 in the log 13. This determination may be performed by a brute force scan of the log 13 to locate a record 14 having valid metadata 52. A current best record 16 variable in the memory 6 is set (at block 104) to the determined valid record 50 in the log 13. The operating system 10 then proceeds to block 106 to initiate the jump ahead phase to locate a potential tail, which may be one of multiple tails, and then confirm through a jump-back-flush-forward phase that the tail is in fact the valid end of log. At block 106, the operating system 10 determines whether the next pointer 58 and far ahead pointer 60 of the current best record 16 point to different records in the log 13. If not, i.e., they point to the same record, then the next record (i.e., the record addressed by the next pointer 58 of the current best record 16), is read (at block 108).

If (at block 110) the next read record is valid and if (at block 112) the read next record is older than the current best record 16, then control proceeds (at block 114) to block 150 in FIG. 4 for the jump-back-flush-forward phase of operations. In the jump-back-flush-forward phase, the current best record 16 comprises a tail of the log 13. To locate the earliest tail if there are multiple tails, the operating system 10 jumps back to the "flushed-up-to" record addressed by the "flushed-up-to" pointer 62, which is a record successfully written to the log 13 in the storage 8, where all previous records were also successfully written. The tail (or current best record) "flushed-up-to" pointer is followed backwards in the log 13, and then the next pointers are followed from the "flushed-up-to" record until an invalid or incomplete record is located. The last valid, complete record comprises the "end of valid log."

If the read next record is valid and older than the current best record 16 (from the no branch of block 112), then the current best record 16 is set (at block 116) to the read next record and control returns to block 106 to process the new current best record 16. If (at block 110) the read next record is not valid and if (at block 118) the "jump ahead found old" variable 18 is true, indicating that a record having an older sequence number was located during the scan, then control also proceeds (at block 114) to block 150 in FIG. 4 to perform the jump-back-flush-forward operation. If (at block 118) no record was located during a jump ahead that had an older sequence number (the "jump ahead found old" 18 is false, or not set), then control proceeds (at block 120) to block 180 in FIG. 5 to initiate a pathological phase to perform a brute force scan of the log 13 because a definitive tail was not located. For instance, if a writer to the log crashes in certain windows of time, then the jump ahead phase (at block 106, 108, 124, 126) might run out of records to search without resulting in a definitive tail of the log 13. In such case, the pathological phase is initiated to use other methods to find an actual tail from which to perform the jump-back-flush-forward operation. To locate the actual tail when the jump ahead phase fails to locate, the operating system 10 may use a brute-force scan of the log 13 until either (1) a new record is found which is more recent than the current best record 16 and then the process returns to the jump ahead phase or (2) the entire log 13 is scanned and no more recent records are found. If no more recent record is found, then the most recent record (current best record 16) is a tail and control proceeds to the jump-back-flush-forward operation in FIG. 4.

If (at block 106) the far ahead pointer 60 and next pointer 58 of the current best record 16 do not address the same record 50, i.e., the far ahead record succeeds the next record, then the operating system 10 determines (at block 122) whether the far ahead record is a valid record. This determination may be made by performing an error checking operation on the record 50 or metadata 52 to determine if it matches the error code 66. If the far ahead record is valid and if (at block 124) has a sequence number 56 greater than the sequence number of the current best record 16, i.e., the far ahead record was written after the current best record, then the current best record 16 is set (at block 126) to the far ahead record and control proceeds back to block 106 to continue to scan through the log 13, and jumping ahead multiple records using the far ahead pointer 60 to optimize advancement through the log 13.

If (at block 124) the valid far ahead record was written before the current best record 16, i.e., has a lesser sequence number, then the "jump ahead found old" variable 18 is set (at block 128) to true, where the default value was false to indicate that an older record was not found following a valid record during the jump ahead using the far ahead pointer 60. Control then proceeds from block 128 to read (at block 108) the next record addressed by the next pointer 58 to try to follow the next pointer 58 to the tail. If (at block 122) the far ahead pointer 60 does not address a valid record, then control proceeds to block 108 to scan forward in the log 13 to the next record addressed by the next pointer 58 of the current best record 18.

With respect to FIG. 4, upon initiating (at block 150) the jump-back-flush-forward operation to locate the valid end of the log 13, the operating system 10 reads (at block 152) the "flushed-up-to" record addressed by the "flushed-up-to" pointer 62 of the current best record 16 and sets the current best record to the read "flushed-up-to" record. If (at block 154) the next pointer 58 of the current best record 16 address a valid next record having a sequence number greater than the sequence number of the current best record 16, then that valid next record is more current and the operating system 10 sets (at block 156) the current best record 16 to the next record to advance through the log 13. Control proceeds from block 156 back to block 154 to continue scrolling through the log 13. If (at block 154) the next pointer record 50 does not address a valid record having a later sequence number, then the end of valid log is reached and the current best record 16 is indicated (at block 158) as the end of valid log 20.

With respect to FIG. 5, upon initiating (at block 180) the pathological phase when a definitive tail has not been reached, i.e., the operating system 10 cannot be determined that the current best record 16 is in fact a tail, then the operating system 10 initiates (at block 182) a sequential scan of records in the log 13 to locate a valid record, or a brute force scan. If (at block 184) a valid record is not located before reaching the end of the log 13, then the current best record 16 is in fact a tail and control proceeds (at block 186) to go to block 150 in FIG. 4 to initiate the jump-back-flush-forward phase to find the end of valid log. If (at block 184) a valid record is located and if (at block 188) the located valid record has a sequence number greater than the sequence number of the current best record 16, then the current best record 16 is set (at block 190) to the determined valid record and control proceeds (at block 192) to block 106 in FIG. 3 to perform the jump ahead phase to jump ahead to locate valid records later in the log 13 sequence in search of the tail. Otherwise, if the located valid record does not have a more recent sequence number than the current best record 16, then the operating system 10 sequentially accesses (at block 194) records from the located valid record to attempt to locate a next valid record. Control proceeds from block 194 to block 184 to process the attempt to locate a next valid record. The pathological phase of FIG. 5 does not follow "next" pointers. Instead, it performs a brute-force search of every physical record until an end of log or new current best record is located at block 190.

In certain embodiments, in FIGS. 3 and 5, a record can be "valid" if the metadata is valid, even if the rest of the record is not complete. In FIG. 4, block 154, only completely valid records (including all user data) are accepted.

With the described embodiments, a valid end of log is determined by processing metadata 52 stored in the records 14 to determine the valid end of log 13 of where to start adding new records to the log 13. With the described embodiments, a checkpoint of the valid end of log does not need to be saved in a static location in the storage device 8 in order to determine the valid end of log because with the described embodiments, the end of log is determined by processing metadata stored in the records. By avoiding the need to save the end of log in a static location, the described embodiments avoid having to perform continual write operations to a same location in the storage device 8 to save the end of log. In embodiments where the storage device 8 comprises a solid state device, avoiding continual writes to a same location to write the end of log can increase the longevity of the device because writes are destructive and writing continually to a same location can destroy the section to which the writes continuously occur. Thus, certain described embodiments eliminate the need for the initialization and write procedures to assume that the checkpoint is always written at the same location on the physical disk.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
   writing records to a log in a storage device in a sequential order, wherein the records include a next pointer addressing a next record in a write order and a far ahead pointer addressing a far ahead record in the write order following the record; and
   using the far ahead pointer and the next pointer in a plurality of records to determine an end of valid log from which to start writing further records by performing:
   determining a valid record in the log;
   setting a current best record to the determined valid record;
   in response to determining that the far ahead record is valid and has a sequence number greater than a sequence number of the current best record, setting the current best record to the far ahead record; and
   performing at least one additional iteration of setting the current best record to the far ahead record until the far ahead pointer addresses a record that is invalid or has a sequence number less than the sequence number of the current best record.

2. The method of claim 1, wherein the using of the far ahead pointer and the next pointer in the records to determine the last valid record in the log is performed in response to a restart operation of the computer to determine the last valid record from which to start writing following the restart operation.

3. The method of claim 1, wherein the storage device comprises a solid state storage device.

4. The method of claim 1, further comprising:
   in response to determining that the next record is valid and has a sequence number less than a sequence number of the current best record, accessing a "flushed-up-to" record addressed by a "flushed-up-to" pointer of the current best record, wherein the "flushed-up-to" record and all preceding records to the "flushed-up-to" record were successfully written to the storage device;
   following the next pointer of the "flushed-up-to" record and at least one record following the "flushed-up-to" record until an invalid next record addressed by one next pointer is located; and
   indicating the last valid record as the record whose next pointer addresses the invalid record.

5. The method of claim 4, further comprising:
   in response to determining that the far ahead record is a valid record having a sequence number less than a sequence number of the current best record, setting a variable and following the next pointer of the "flushed-up-to" record and at least one record addressed by the next pointer of the record following the "flushed-up-to" record until an invalid record addressed by one next pointer is located; and
   indicating the last valid record as the record whose next pointer addresses the invalid record.

6. The method of claim 5, further comprising:
   in response to determining that the far ahead record is an invalid record, repeatedly reading the next record of read records in the log until a valid record having a sequence number greater than a previously accessed valid record is accessed or an end of the log is reached.

7. The method of claim 6, further comprising:
   in response to reaching an end of the log without locating a valid record, using the "flushed-up-to" pointer of the current best record to locate the end of valid log; and
   in response to locating a valid record having a sequence number greater than the sequence number of the current best record, setting the variable and following the next pointer of the "flushed-up-to" record and at least one record addressed by the next pointer of the record following the "flushed-up-to" record until an invalid record addressed by one next pointer is located.

8. The method of claim 5, wherein the operations of determining whether the far ahead record is a valid record having a sequence number greater than a sequence number of the current best record and whether the far ahead record is an invalid record are performed in response to determining that the far ahead pointer and the next pointer address different records, further comprising setting the current best record to the next record addressed by the next pointer in response to determining that the next record is valid and newer than the current best record.

9. A computer program product for communicating with a storage device, the computer program product comprising a computer readable storage medium having computer readable program code embodied therein that executes to perform operations, the operations comprising:
   writing records to a log in the storage device in a sequential order, wherein the records include a next pointer addressing a next record in a write order and a far ahead pointer addressing a far ahead record in the write order following the record; and
   using the far ahead pointer and the next pointer in a plurality of records to determine an end of valid log from which to start writing further records by performing:
   determining a valid record in the log;
   setting a current best record to the determined valid record;
   in response to determining that the far ahead record is valid and has a sequence number greater than a sequence number of the current best record, setting the current best record to the far ahead record; and
   performing at least one additional iteration of setting the current best record to the far ahead record until the far ahead pointer addresses a record that is invalid or has a sequence number less than the sequence number of the current best record.

10. The computer program product of claim 9, wherein the using of the far ahead pointer and the next pointer in the records to determine the last valid record in the log is performed in response to a restart operation of the computer to determine the last valid record from which to start writing following the restart operation.

11. The computer program product of claim 9, wherein the storage device comprises a solid state storage device.

12. The computer program product of claim 9, wherein the operations further comprise:
in response to determining that the next record is valid and has a sequence number less than a sequence number of the current best record, accessing a "flushed-up-to" record addressed by a "flushed-up-to" pointer of the current best record, wherein the "flushed-up-to" record and all preceding records to the "flushed-up-to" record were successfully written to the storage device;
following the next pointer of the "flushed-up-to" record and at least one record following the "flushed-up-to" record until an invalid next record addressed by one next pointer is located; and
indicating the last valid record as the record whose next pointer addresses the invalid record.

13. The computer program product of claim 12, wherein the operations further comprise:
in response to determining that the far ahead record is a valid record having a sequence number less than a sequence number of the current best record, setting a variable and following the next pointer of the "flushed-up-to" record and at least one record addressed by the next pointer of the record following the "flushed-up-to" record until an invalid record addressed by one next pointer is located; and
indicating the last valid record as the record whose next pointer addresses the invalid record.

14. The computer program product of claim 13, wherein the operations further comprise:
in response to determining that the far ahead record is an invalid record, repeatedly reading the next record of read records in the log until a valid record having a sequence number greater than a previously accessed valid record is accessed or an end of the log is reached.

15. The computer program product of claim 14, wherein the operations further comprise:
in response to reaching an end of the log without locating a valid record, using the "flushed-up-to" pointer of the current best record to locate the end of valid log; and
in response to locating a valid record having a sequence number greater than the sequence number of the current best record, setting the variable and following the next pointer of the "flushed-up-to" record and at least one record addressed by the next pointer of the record following the "flushed-up-to" record until an invalid record addressed by one next pointer is located.

16. The computer program product of claim 13, wherein the operations of determining whether the far ahead record is a valid record having a sequence number greater than a sequence number of the current best record and whether the far ahead record is an invalid record are performed in response to determining that the far ahead pointer and the next pointer address different records, further comprising setting the current best record to the next record addressed by the next pointer in response to determining that the next record is valid and newer than the current best record.

17. A system in communication with a storage device, comprising:
a processor;
a computer readable storage medium including a program executed by the processor to perform operations, the operations comprising:
writing records to a log in a storage device in a sequential order, wherein the records include a next pointer addressing a next record in a write order and a far ahead pointer addressing a far ahead record in the write order following the record; and
using the far ahead pointer and the next pointer in a plurality of records to determine an end of valid log from which to start writing further records by performing:
determining a valid record in the log;
setting a current best record to the determined valid record;
in response to determining that the far ahead record is valid and has a sequence number greater than a sequence number of the current best record, setting the current best record to the far ahead record; and
performing at least one additional iteration of setting the current best record to the far ahead record until the far ahead pointer addresses a record that is invalid or has a sequence number less than the sequence number of the current best record.

18. The system of claim 17, wherein the using of the far ahead pointer and the next pointer in the records to determine the last valid in the log is performed in response to a restart operation of the computer to determine the last valid record from which to writing following the restart operation.

19. The system of claim 17, wherein the storage device comprises a solid state storage device.

20. The system of claim 17, wherein the operations further comprise:
in response to determining that the next record is valid and has a sequence number less than a sequence number of the current best record, accessing a "flushed-up-to" record addressed by a "flushed-up-to" pointer of the current best record, wherein the "flushed-up-to" record and all preceding records to the "flushed-up-to" record were successfully written to the storage device;
following the next pointer of the "flushed-up-to" record and at least one record following the "flushed-up-to" record until an invalid next record addressed by one next pointer is located; and
indicating the last valid record as the record whose next pointer addresses the invalid record.

21. The system of claim 20, wherein the operations further comprise:
in response to determining that the far ahead record is a valid record having a sequence number less than a sequence number of the current best record, setting a variable and following the next pointer of the "flushed-up-to" record and at least one record addressed by the next pointer of the record following the "flushed-up-to" record until an invalid record addressed by one next pointer is located; and
indicating the last valid record as the record whose next pointer addresses the invalid record.

22. The system of claim 21, wherein the operations of determining whether the far ahead record is a valid record having a sequence number greater than a sequence number of the current best record and whether the far ahead record is an invalid record are performed in response to determining that the far ahead pointer and the next pointer address different records, further comprising setting the current best record to the next record addressed by the next pointer in response to determining that the next record is valid and newer than the current best record.

* * * * *